(12) United States Patent
Abeta et al.

(10) Patent No.: US 6,647,003 B1
(45) Date of Patent: Nov. 11, 2003

(54) CHANNEL ESTIMATION UNIT, AND CDMA RECEIVER AND CDMA TRANSCEIVER WITH CHANNEL ESTIMATION UNIT

(75) Inventors: Sadayuki Abeta, Kanagawa (JP); Mamoru Sawahashi, Kanagawa (JP); Fumiyuki Adachi, Kanagawa (JP)

(73) Assignee: NTT Mobile Commmunications Network, Inc. (JP)

( * ) Notice: Subject to any disclaimer, the term of this patent is extended or adjusted under 35 U.S.C. 154(b) by 0 days.

(21) Appl. No.: 09/358,037

(22) Filed: Jul. 20, 1999

Related U.S. Application Data

(63) Continuation of application No. PCT/JP98/05241, filed on Nov. 20, 1998.

(30) Foreign Application Priority Data

Nov. 21, 1997 (JP) .............................................. 9-321561

(51) Int. Cl.[7] .............................................. H04B 7/216
(52) U.S. Cl. ........................ 370/335; 370/480; 370/491
(58) Field of Search ................................. 370/252, 335, 370/342, 441, 491, 479, 318, 320, 332, 333, 337, 498, 500; 375/130, 200, 134, 231; 379/343

(56) References Cited

U.S. PATENT DOCUMENTS

| | | | |
|---|---|---|---|
| 5,442,662 A | | 8/1995 | Fukasawa et al. |
| 5,737,327 A | * | 4/1998 | Ling et al. .................... 370/318 |
| 6,070,086 A | * | 5/2000 | Dobrica ....................... 455/522 |
| 6,097,711 A | * | 8/2000 | Okawa et al. ............... 370/335 |
| 6,137,788 A | * | 10/2000 | Sawahashi et al. ......... 370/342 |
| 6,175,588 B1 | * | 1/2001 | Visotsky et al. ............. 375/148 |
| 6,192,040 B1 | * | 2/2001 | Jalloul et al. ................ 370/335 |
| 6,208,632 B1 | * | 3/2001 | Kowalski et al. ............ 370/335 |
| 6,304,624 B1 | * | 10/2001 | Seki et al. ................... 375/365 |

FOREIGN PATENT DOCUMENTS

| | | |
|---|---|---|
| EP | 07221264 | 7/1996 |
| JP | Hei 8-335898 | 6/1995 |
| JP | 07221700 | 8/1995 |
| JP | 08088589 | 4/1996 |
| JP | Hei 10-145839 | 5/1996 |
| JP | 09008770 A | 1/1997 |
| JP | 09-261204 | 3/1997 |
| JP | 10051424 A | 2/1998 |
| JP | 10190494 A | 7/1998 |
| WO | WO 92/00639 | 1/1992 |
| WO | WO 97/25780 | 1/1992 |
| WO | WO 96/10879 | 4/1996 |

OTHER PUBLICATIONS

Hidehiro Andoh, Mamoru Sawahashi, A synonym for "Channel Estimation Scheme Using the Plural of Pilot Blocks for DS–CDMA Mobile Radio". Technical Research Report of The Institute of Electronics, Information and Communications Engineers, Aug. 9, 1996, vol. 96, No. 213, RCS96–72, p.p. 45–50 (with English abstract).

(List continued on next page.)

*Primary Examiner*—Dang Ton
*Assistant Examiner*—Phuc Tran
(74) *Attorney, Agent, or Firm*—Brown, Raysman, Millstein Felder & Steiner LLP

(57) ABSTRACT

There are provided a channel estimation unit for achieving highly accurate channel estimation, a CDMA receiver and a CDMA transceiver with the channel estimation unit. Channel estimates of data symbols are obtained from a pilot symbol sequence which is parallel with a data symbol sequence. First, a plurality of pilot blocks are generated from the pilot symbol sequence. The channel estimates of the data symbols are obtained by calculating a sum of appropriately weighted averages of pilot symbols in the individual pilot blocks. This enables highly accurate channel estimation. More accurate channel estimation can be achieved by carrying out the channel estimation of the data symbols using the pilot symbols belonging to other slots rather than limiting to the pilot symbols in the slot to which the estimated data symbol belongs.

24 Claims, 13 Drawing Sheets

OTHER PUBLICATIONS

Hidehiro Andoh, Yoshinori Miki and Mamoru Sawahashi, A synonym for "Coherent Orthogonal Filter using pilot channel data estimation in DS–CDMA Forward link Channels", Technical Research Report of The Institute of Electronics. Information and Communications Engineers, Apr. 1995, RCS95-6, p.p. 33–38 (with English abstract).

Official Notice of Rejection and English translation for Korean patent app. No. 10–1999–700–6573.

Korean Patent Office, Official Notice of Rejection, Application No. 10–1999–7006573, CDMA Estimating Appearance et al.. ps. 1–5, Seoul, Korea, Feb. 20, 2002.

"DS/CDMA Coherent Detection System With A Suppressed Pilot Channel", Sadayuki Abeta, et al., 1994 IEEE.

"A Coherent Detection System With A Suppressed Pilot Channel for DS/CDMA Systems", Sadayuki Abeta, et al., 1994.

"Performance Comparison Between Time–Multiplexed Pilot Channel and Parallel Pilot Channel for Coherent Rake Combining in DS–CDMA Mobile Radio", Sadayuki Abeta, et al., Jul. 1998.

"The Performance of Channel Estimation Method Using Weighted Multi–Symbol Averaging (WMSA) With Pilot Channel in DS–CDMA", Sadayuki Abeta, et al., 1997.

* cited by examiner

CHANNEL ESTIMATION UNIT, AND CDMA RECEIVER AND CDMA TRANSCEIVER WITH CHANNEL ESTIMATION UNIT

This application is a continuation of PCT/JP98/05241, filed Nov. 20, 1998, which claims priority of JP 9/321561, filed Nov. 21, 1997.

TECHNICAL FIELD

The present invention relates to a device for making channel estimation (propagation path estimation) of data symbols from a pilot symbol sequence parallel to a data symbol sequence, and a CDMA (Code Division Multiple Access) receiver and CDMA transmitter with the device.

BACKGROUND ART

In a mobile communications environment, amplitude and phase fluctuations in a traffic channel can occur because of Rayleigh fading due to changes in the relative location between a mobile station and a base station. Thus, in a conventional phase modulation scheme that transmits data (information) by the phase of a carrier, it is common for a transmitting side to carry out differential encoding of transmitted data for impressing the data on relative phases of neighboring symbols, and for a receiving side to discriminate and decide the data by differential detection.

However, since the transmitted data is subjected to the differential encoding as mentioned above, a one-bit error in a radio section appears as a two-bit error in the differential detection, thereby increasing the receiving error rate by 3 dB in terms of the SNIR (Signal-to-Noise Interference power Ratio) as compared with coherent detection like binary phase-shift keyed modulation (BPSK modulation).

On the other hand, although absolute coherent detection, which discriminates and decides the phase of a received signal using the absolute phase of each data symbol, has a highly efficient receiving characteristic, it is difficult under the Rayleigh fading environment to decide the absolute phase of the reception.

In regard to this matter, Sadayuki Abeta, et al., "DS/CDMA Coherent Detection System with a Suppressed Pilot Channel", IEEE GLOBECOM'94, pp. 1622–1626, 1994, proposes a method of estimating fading distortion by inserting, in parallel with a data channel for transmitting data, a pilot channel which is orthogonal to the data channel and has known phases, thereby compensating for the fading distortion.

FIG. 13 illustrates a channel estimation method disclosed in this paper. In FIG. 13, the channel estimation is carried out using a pilot symbol sequence parallel with a data symbol sequence. To reduce a power loss, the power of the pilot symbol sequence is set less than that of the data symbol sequence.

In addition, to follow instantaneous Rayleigh fluctuations, the transmission power control is carried out on a slot by slot basis. Accordingly, as shown in FIG. 13, the amplitudes (powers) of the data symbol sequence and pilot symbol sequence vary slot by slot, and their phases also vary slightly due to the operation of amplifiers during transmission. Such transmission power control enables a reverse channel of the DS-CDMA (Direct Sequence CDMA) to maintain the SNIR against interference signals due to cross-correlation from other users.

The channel estimation of data symbols obtains its channel estimates by averaging (coherently adding) pilot symbols (estimated complex fading envelope) in a section (slot, in this case) to which the data symbols belong. The channel estimation with high SNIR is carried out in this manner. The estimates are employed to detect with the pilot symbols in the data symbol sections the received signal of a path of each user, to measure the amplitude and phase of the signal of each path, and to estimate and compensate for the channel fluctuations in the data symbol sections.

However, it is difficult for the foregoing method disclosed in the paper to achieve highly accurate channel estimation. This is because the method obtains the channel estimates by only averaging the pilot symbols in the slot including the data symbols to be subjected to the channel estimation.

Furthermore, in an actual mobile transmission environment, thermal noise (reducing the transmission power as low as possible creates a noise-limited environment, particularly at cell borders) and interference signals from other users due to cross-correlation are added to a desired signal of the channel to be received, and the phase and amplitude of the received signal vary every moment because of fading, which degrades the channel estimation accuracy. In summary, it is difficult for the method disclosed in the foregoing paper, which carries out the channel estimation of the data symbols using only the pilot symbols in the slot containing the data symbols, to achieve highly accurate channel estimation.

DISCLOSURE OF THE INVENTION

The present invention is implemented to solve the foregoing problems. It is therefore an object of the present invention to achieve highly accurate channel estimation by obtaining highly accurate channel estimates by calculating a sum of appropriately weighted pilot symbols when carrying out the channel estimation of the data symbols.

Furthermore, the present invention can achieve higher accuracy channel estimation by carrying out the channel estimation of the data symbols using pilot symbols not only in the slot containing the data symbols, but also in other slots.

The highly accurate channel estimation and compensation for channel fluctuations in the data symbols based on the channel estimation make it possible for the absolute coherent detection to decide the absolute phase of each data symbol even in the Rayleigh fading environment, which can reduce the SNIR for achieving desired receiving quality (receiving error rate). This can reduce the transmission power, and increase the capacity of a system in terms of the number of simultaneous In order to accomplish the object aforementioned in the first aspect of the present invention, there is provided a channel estimation unit for obtaining channel estimates of data symbols from a pilot symbol sequence which is parallel to a data symbol sequence that comprises:

means for generating a plurality of pilot blocks from the pilot symbol sequence; and means for obtaining the channel estimates of the data symbols by calculating a weighted sum of averages of the pilot symbols in the individual pilot blocks.

In the second aspect of the present invention, there is provided a CDMA receiver which receives a data symbol sequence that is spread, and a pilot symbol sequence that is spread and parallel to the data symbol sequence, and which generates a data sequence by demodulating the spread data symbol sequence by using the spread pilot symbol sequence, and which comprises:

means for receiving the spread data symbol sequence and the spread pilot symbol sequence;

means for generating a data symbol sequence by despreading the spread data symbol sequence;

means for generating a pilot symbol sequence by despreading the spread pilot symbol sequence;

means for generating from the pilot symbol sequence a plurality of pilot blocks;

means for obtaining channel estimates of the data symbols by calculating a weighted sum of averages of the pilot symbols in the individual pilot blocks;

means for compensating for channel fluctuations in the data symbol sequence by using the channel estimates of the data symbols; and means for generating the data sequence by demodulating the data symbol sequence compensated for.

Here, the spread data symbol sequence may have been spread using a first spreading code, the spread pilot symbol sequence may have been spread using a second spreading code, the means for generating the data symbol sequence may despread the spread data symbol sequence which has been spread using the first spreading code, and the means for generating the pilot symbol sequence may despread the spread pilot sequence which has been spread using the second spreading code, and the first spreading code and the second spreading code may be orthogonal to each other.

In the third aspect of the present invention, there is provided a CDMA transceiver have a transmitting processor and a receiving processor, the transmitting processor generate a spread data symbol sequence by modulating a data sequence, and transmits the spread data symbol sequence with a spread pilot symbol sequence which is spread in parallel with the data symbol sequence, and the receiving processor receives the spread data symbol sequence and the spread pilot symbol sequence, and generate the data sequence by demodulating the spread data symbol sequence by using the spread pilot symbol sequence, wherein wherein the transmitting processor comprises:
means for generating the data symbol sequence by modulating the data sequence;
means for generating the spread data symbol sequence by spreading the data symbol sequence;
means for generating the spread pilot symbol sequence by spreading the pilot symbol sequence; and
means for transmitting the spread data symbol sequence and the spread pilot symbol sequence, and wherein the receiving processor comprises:
means for receiving the spread data symbol sequence and the spread pilot symbol sequence;
means for generating the data symbol sequence by despreading the spread data symbol sequence;
means for generating the pilot symbol sequence by despreading the spread pilot symbol sequence;
means for generating from the pilot symbol sequence a plurality of pilot blocks;
means for obtaining channel estimates of the data symbols by calculating a weighted sum of averages of the pilot symbols in the individual pilot blocks;
means for compensating for channel fluctuations in the data symbol sequence by using the channel estimates of the data symbols; and
means for generating the data sequence by demodulating the data symbol sequence compensated for.

Here, the means for generating the spread data symbol sequence may spread the data symbol sequence using a first spreading code, the means for generating the spread pilot symbol sequence may spread the pilot symbol sequence using a second spreading code, the means for generating the data symbol sequence may despread the spread data symbol sequence which has been spread using the first spreading code, and the means for generating the pilot symbol sequence may despread the spread pilot symbol sequence which has been spread using the second spreading code, and the first spreading code and the second spreading code may be orthogonal to each other.

Here, the means for transmitting the spread data symbol sequence and the spread pilot symbol sequence may also transmit a spread power control symbol sequence for controlling power of the data symbol sequence and that of the pilot symbol sequence.

Here, the transmitting processor may further comprise means for inserting into the data symbol sequence the power control symbol sequence.

Here, the transmitting processor may further comprise means for inserting into the pilot symbol sequence the power control symbol sequence.

Here, the transmitting processor may further comprise means for generating the spread power control symbol sequence by spreading the power control symbol sequence, and the means for transmitting the spread data symbol sequence and the spread pilot symbol sequence may also transmit the power control symbol sequence.

Here, the means for generating a spread data symbol sequence may spread the data symbol sequence by using a first spreading code, the means for generating a spread pilot symbol sequence may spread the pilot symbol sequence by using a second spreading code, and the means for generating a spread power control symbol sequence may spread the power control symbol sequence by using a third spreading code, and the means for generating a data symbol sequence may despread the spread data symbol sequence by using the first spreading code, the means for generating a pilot symbol sequence may despread the spread pilot symbol sequence by using the second spreading code, and the means for generating a power control symbol sequence may despread the spread power control symbol sequence by using the third spreading code, and the first spreading code, the second spreading code and the third spreading code may be orthogonal to each other.

Here, the receiving processor may further comprise means for measuring from the pilot symbol sequence a signal-to-noise and interference power ratio, and for generating the power control symbol sequence from the signal-to-noise and interference power ratio.

Here, the receiving processor may further comprise means for generating the power control symbol sequence by despreading the spread power control symbol sequence for controlling the power of the data symbol sequence and that of the pilot symbol sequence; and means for extracting the power control symbol sequence, and the means for receiving the spread data symbol sequence and the spread pilot symbol sequence may receive the spread power control symbol sequence, and the means for transmitting the spread data symbol sequence and the spread pilot symbol sequence may transmit the spread data symbol sequence and the spread pilot symbol sequence in accordance with the power control symbol sequence.

Here, the power of the data symbol sequence and that of the pilot symbol sequence may be controlled on a slot by slot basis, and the plurality of pilot blocks may consist of pilot symbols belonging to at least two different slots.

Here, when obtaining the channel estimate of an nth data symbol in the data symbol sequence, where n is an integer, the plurality of the pilot blocks may consist of pilot symbols from (n−K+1)th pilot symbol to (n+K)th pilot symbol in the pilot symbol sequence, where K is a natural number.

Here, the plurality of pilot blocks may have a same length, each.

Here, when obtaining the channel estimate of an nth data symbol in the data symbol sequence, where n is an integer, the pilot blocks consisting of pilot symbols closer to the nth pilot symbol may have a greater weight.

In the fourth aspect of the present invention, there is provided a channel estimation method for obtaining channel estimates of data symbols from a pilot symbol sequence which is parallel with a data symbol sequence, comprises the steps of:

generating a plurality of pilot blocks from the pilot symbol sequence; and obtaining the channel estimates of the data symbols by calculating a weighted sum of averages of the pilot symbols in the individual pilot blocks.

In the fifth aspect of the present invention, there is provided a CDMA receiving method which receives a data symbol sequence that is spread, and a pilot symbol sequence that is spread and parallel to the data symbol sequence, and which generates a data sequence by demodulating the spread data symbol sequence by using the spread pilot symbol sequence comprises the steps of:

receiving the spread data symbol sequence and the spread pilot symbol sequence;

generating a data symbol sequence by despreading the spread data symbol sequence;

generating a pilot symbol sequence by despreading the spread pilot symbol sequence;

generating from the pilot symbol sequence a plurality of pilot blocks;

obtaining channel estimates of the data symbols by calculating a weighted sum of averages of the pilot symbols in the individual pilot blocks;

compensating for channel fluctuations in the data symbol sequence by using the channel estimates of the data symbols; and generating the data sequence by demodulating the data symbol sequence compensated for.

In the sixth aspect of the present invention, there is provided a CDMA transmitting and receiving method which generates a spread data symbol sequence by modulating a data sequence, transmits the spread data symbol sequence with a pilot symbol sequence which is spread in parallel with the data symbol sequence, receives the spread data symbol sequence and the spread pilot symbol sequence, and generates the data sequence by demodulating the spread data symbol sequence by using the spread pilot symbol sequence, wherein a transmitting side comprises the steps of:
generating the data symbol sequence by modulating the data sequence;
generating the spread data symbol sequence by spreading the data symbol sequence;
generating the spread pilot symbol sequence by spreading the pilot symbol sequence; and
transmitting the spread data symbol sequence and the spread pilot symbol sequence, and wherein a receiving side comprises the steps of:
receiving the spread data symbol sequence and the spread pilot symbol sequence;
generating the data symbol sequence by despreading the spread data symbol sequence;

generating the pilot symbol sequence by despreading the spread pilot symbol sequence;
generating from the pilot symbol sequence a plurality of pilot blocks;
obtaining channel estimates of the data symbols by calculating a weighted sum of averages of the pilot symbols contained in the pilot blocks;
compensating for channel fluctuations in the data symbol sequence by using the channel estimates of the data symbols; and
generating the data sequence by demodulating the data symbol sequence compensated for.

BEST MODE FOR CARRYING OUT THE INVENTION

Best modes for implementing the present invention will now be described in detail with reference to the accompanying drawings.

[First Embodiment]

Figure 1:
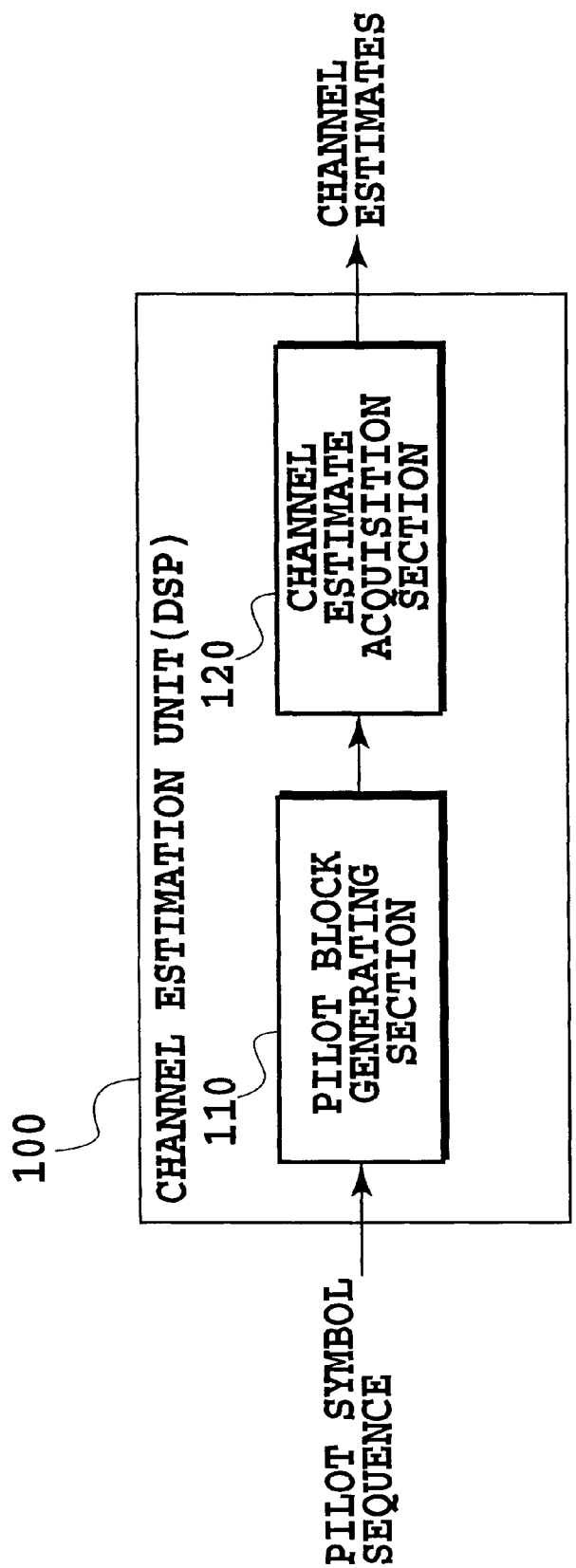
FIG. 1 is a block diagram showing a configuration of a channel estimation unit as a first embodiment in accordance with the present invention.

FIG. 1 is a block diagram showing a configuration of a channel estimation unit as a first embodiment in accordance with the present invention. A channel estimation unit 100 of the present embodiment obtains channel estimates of data symbols from a pilot symbol sequence parallel with a data symbol sequence.

The channel estimation unit 100 comprises a pilot block generating section 110 and a channel estimate acquisition section 120. Although the channel estimation unit 100 is implemented in the present embodiment in the form of software using a DSP (Digital Signal Processor) (together with a memory that stores programs), it can be implemented in the form of hardware, in which case, components such as delay circuits are used as needed.

Figure 2:
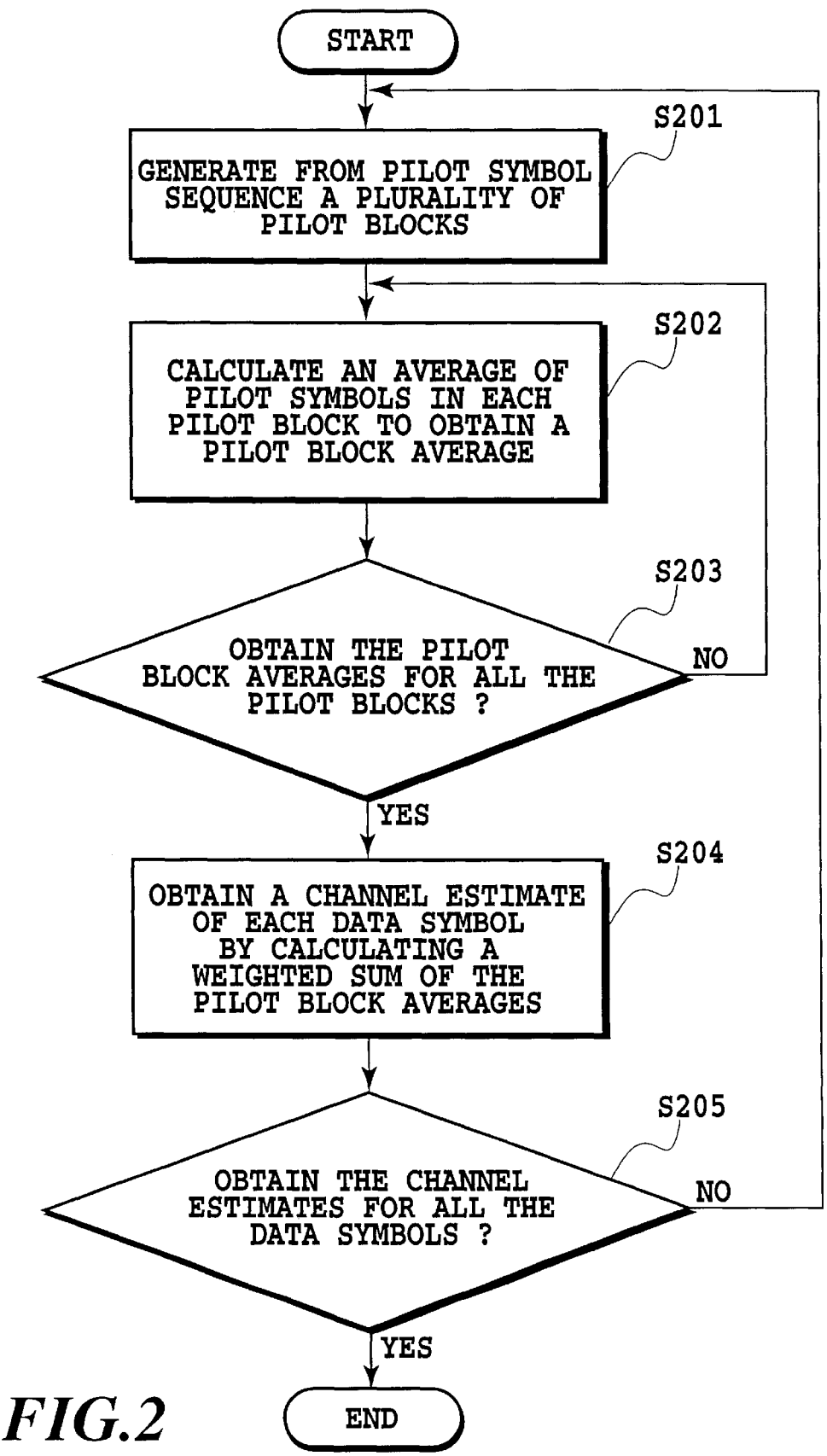
FIG. 2 is a flowchart illustrating a channel estimation processing by the channel estimation unit of the first embodiment in accordance with the present invention.
Figure 3:
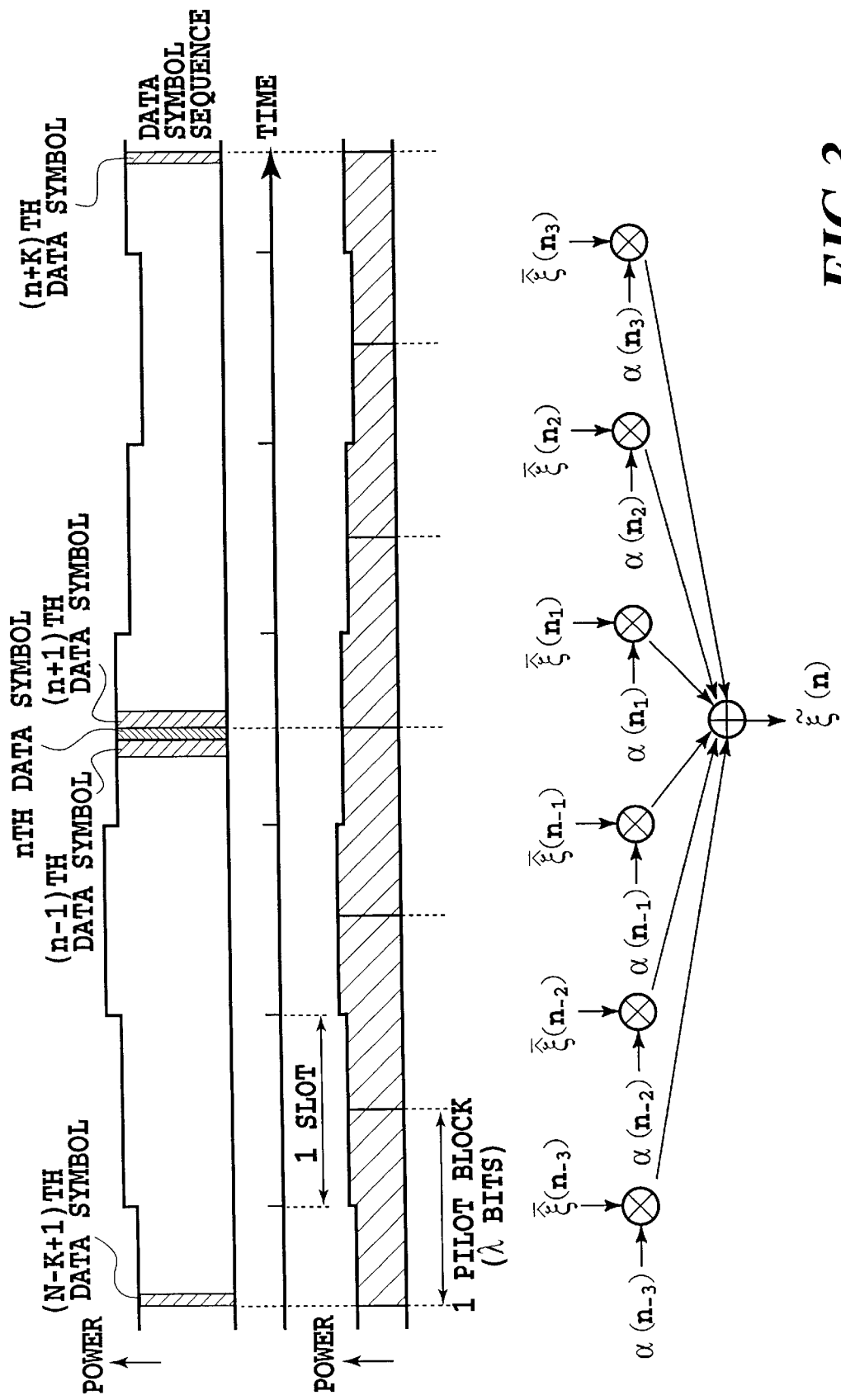
FIG. 3 is a diagram illustrating, taking an example of the channel estimation, the principle of operation of the channel estimation by the channel estimation unit of the first embodiment in accordance with the present invention.

FIG. 2 is a flowchart illustrating a channel estimation processing by the channel estimation unit of the present embodiment, and FIG. 3 is a diagram illustrating, taking an example that obtains the channel estimates of an nth data symbol (n is a natural number), the operation principle of the channel estimation unit of the present embodiment. In the example of FIG. 3, both the data symbol sequence and the pilot symbol sequence undergo the transmission power control on a slot by slot basis.

First, at step S201, the pilot block generating section 110 generates from the pilot symbol sequence a plurality of pilot blocks. To generate L (three, in this example) pilot blocks each with a length of λ bits before and after the nth pilot symbol, the example as shown in FIG. 3 uses pilot symbols from (n−K+1)th to (n+K)th pilot symbols, where K=L×λ is a natural number.

It is preferable to generate the pilot blocks from pilot symbols belonging to different multiple slots to use these plot symbols for the channel estimation. Using pilot symbols of different slots has an advantage of reducing the effect of the thermal noise and interference signals, which is greater than channel estimation error due to differences in power between the pilot symbols of different slots, making it possible to achieve the channel estimation at higher accuracy. In the example as shown in FIG. 3, six pilot blocks are generated from pilot symbols belonging to seven slots.

To obtain the channel estimate of the nth data symbol, it is not necessary to generate the same number of pilot blocks before and after the nth pilot symbol as in the example of FIG. 3. Thus, considering the delay of the channel estimation, the pilot blocks can be generated only from the pilot symbols with the number smaller than (previous to) the nth pilot symbol.

The length of a pilot block can be determined independently of the length of a slot. For example, the length of a pilot block can be equal to that of a pilot symbol, that is, a pilot block can consist of a single pilot symbol. Besides, the length of a pilot block can be varied from block to block.

At steps S202–S204, the channel estimate acquisition section 120 obtains the channel estimates of the data symbols. First, at step S202, the channel estimate acquisition section 120 calculates an average of the pilot symbols $\xi$ (estimated complex fading envelope) in each pilot block to obtain the pilot block average $\bar{\xi}$, which is carried out for all the pilot blocks (step S203). When each pilot block consists of only one pilot symbol, the pilot symbol $\xi$ itself becomes the pilot symbol average $\bar{\xi}$. In the example of FIG. 3, the pilot block averages $\bar{\xi}(n_i)$ are each obtained for ith pilot blocks (i=−L to L, i≠0).

At step S204, the channel estimate acquisition section 120 calculates the weighted sum of the pilot block averages $\bar{\xi}$ to obtain the channel estimates $\xi$ of the data symbol. In the example of FIG. 3, the channel estimate $\xi$ (n) of the nth data symbol is obtained by placing the weights of the ith blocks at α($n_i$). The channel estimate $\xi$ (n) is given by the following equation (1).

$$\xi(n) = \sum_{i=-L, i \neq 0}^{L} \alpha(n_i) \cdot \bar{\xi}(n_i) \tag{1}$$

It is preferable to increase the weights α ($n_i$) of the pilot blocks that include pilot symbols closer (closer in time) to the nth pilot symbol. This is because such pilot blocks can be considered to represent the state of the propagation path during the transmission of the nth data symbol more correctly because the propagation path fluctuates at every moment.

The channel estimate acquisition section 120 iterates the foregoing steps S201–S204 for all the data symbols with which the channel estimates must be obtained (step S205). Thus, highly accurate channel estimates can be obtained.

[Second Embodiment]

Figure 4:
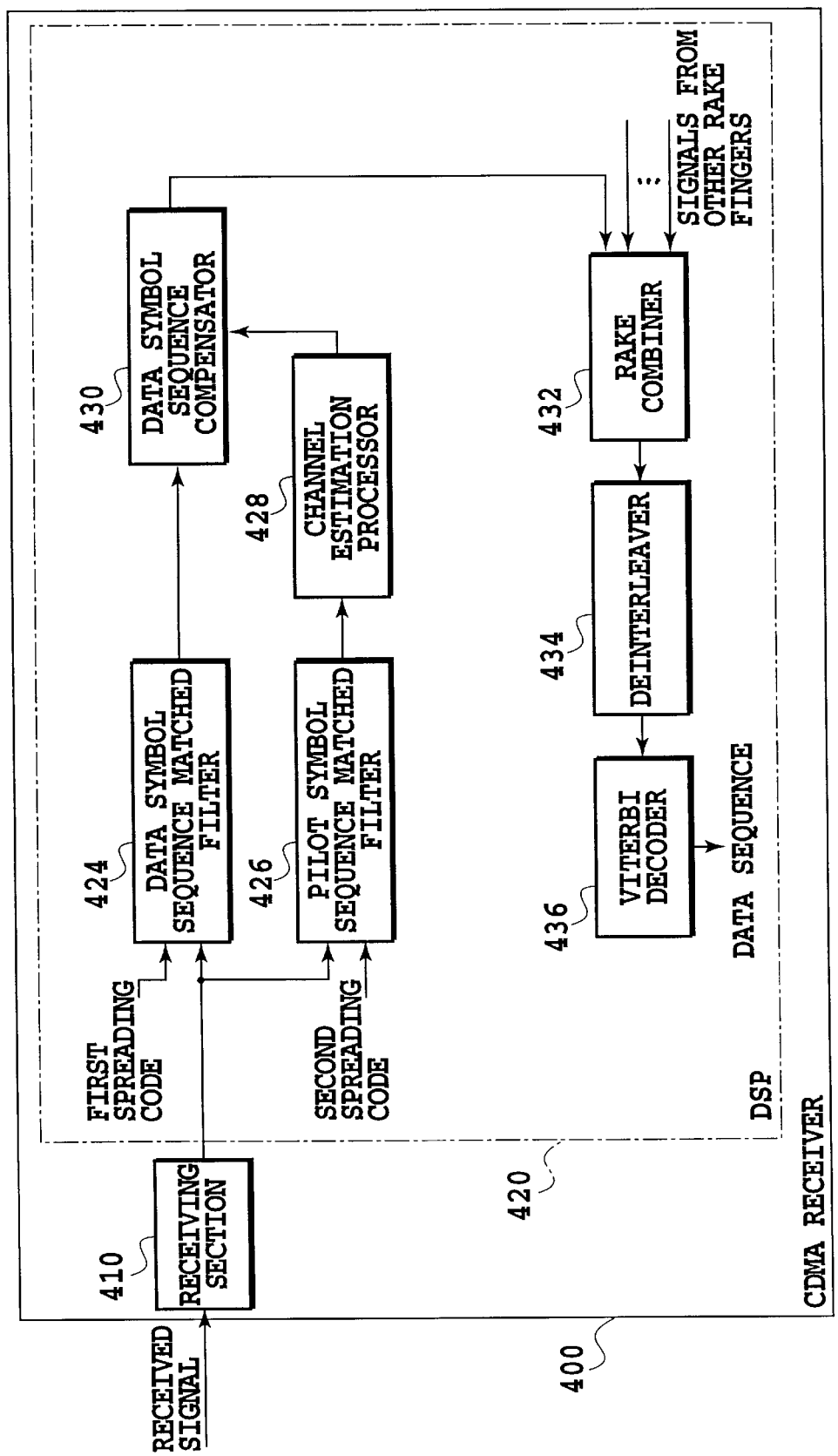
FIG. 4 is a block diagram showing a configuration of a CDMA receiver as a second embodiment in accordance with the present invention.

FIG. 4 is a block diagram showing a configuration of a CDMA receiver as a second embodiment in accordance with the present invention. A CDMA receiver 400 of the present embodiment receives a data symbol sequence which is spread, and a pilot symbol sequence which is spread and parallel to the data symbol sequence, and restores the data sequence by demodulating the spread data symbol sequence using the spread pilot symbol sequence.

The CDMA receiver 400 comprises a receiving section 410, a data symbol sequence matched filter 424, a pilot symbol sequence matched filter 426, a channel estimation processor 428, a data symbol sequence compensator 430, a RAKE combiner 432, a deinterleaver 434 and a Viterbi decoder 436. Although these components such as the data symbol sequence matched filter 424, pilot symbol sequence matched filter 426 and so forth are implemented in the form of software using a DSP (and a memory that stores programs) 420 as shown in FIG. 4 in the present embodiment, they can be implemented with hardware. The structure and functions of the channel estimation processor 428 are the same as those of the channel estimation unit 100 of the first embodiment in accordance with the present invention.

Figure 5:
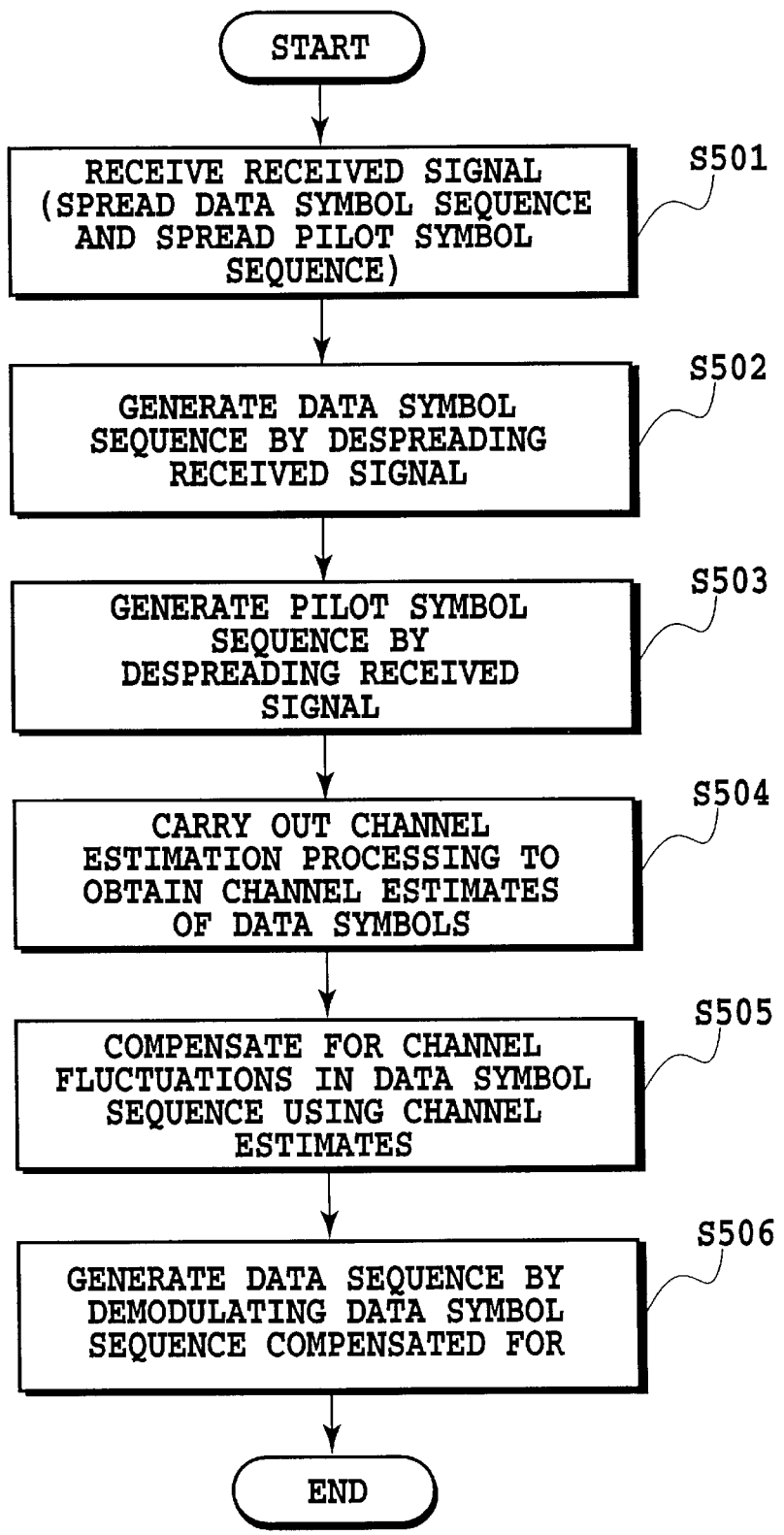
FIG. 5 is a flowchart illustrating a receiving processing by the CDMA receiver of the second embodiment in accordance with the present invention.

FIG. 5 is a flowchart illustrating a receiving processing by the CDMA receiver of the second embodiment in accordance with the present invention. First, at step S501, the receiving section 410 receives the received signal, that is, the spread data symbol sequence and the spread pilot symbol sequence.

In the present embodiment, it is assumed that the received data symbol sequence and pilot symbol sequence have been spread using a first spreading code and a second spreading code, respectively, which are orthogonal to each other. At step S502, the data symbol sequence matched filter 424 despreads the received signal using the first spreading code, thereby generating the data symbol sequence. At step S503, the pilot symbol sequence matched filter 426 despreads the received signal using the second spreading code, thereby generating the pilot symbol sequence.

At step S504, the channel estimation processor 428 carries out a channel estimation processing to obtain the channel estimates of the data symbols. The channel estimation processing is the same as that of the channel estimation unit 100 (FIG. 2) of the first embodiment in accordance with the present invention.

At step S505, the data symbol sequence compensator 430 compensates for the channel fluctuations in the data symbol sequence using the channel estimates ζ. More specifically, it compensates for the channel fluctuations in the data symbols by multiplying the data symbol sequence by the complex conjugates of the channel estimates ζ.

At step S506, the RAKE combiner 432, deinterleaver 434 and Viterbi decoder 436 generates the data sequence by demodulating the compensated data symbol sequence. The RAKE combiner 432 carries out the in-phase combining of the compensated data symbol sequence fed from individual RAKE fingers.

Thus, the receiving processing can achieve highly accurate channel estimation, and the compensation for the channel fluctuations in the data symbol sequence.

[Third Embodiment]

Figure 6:
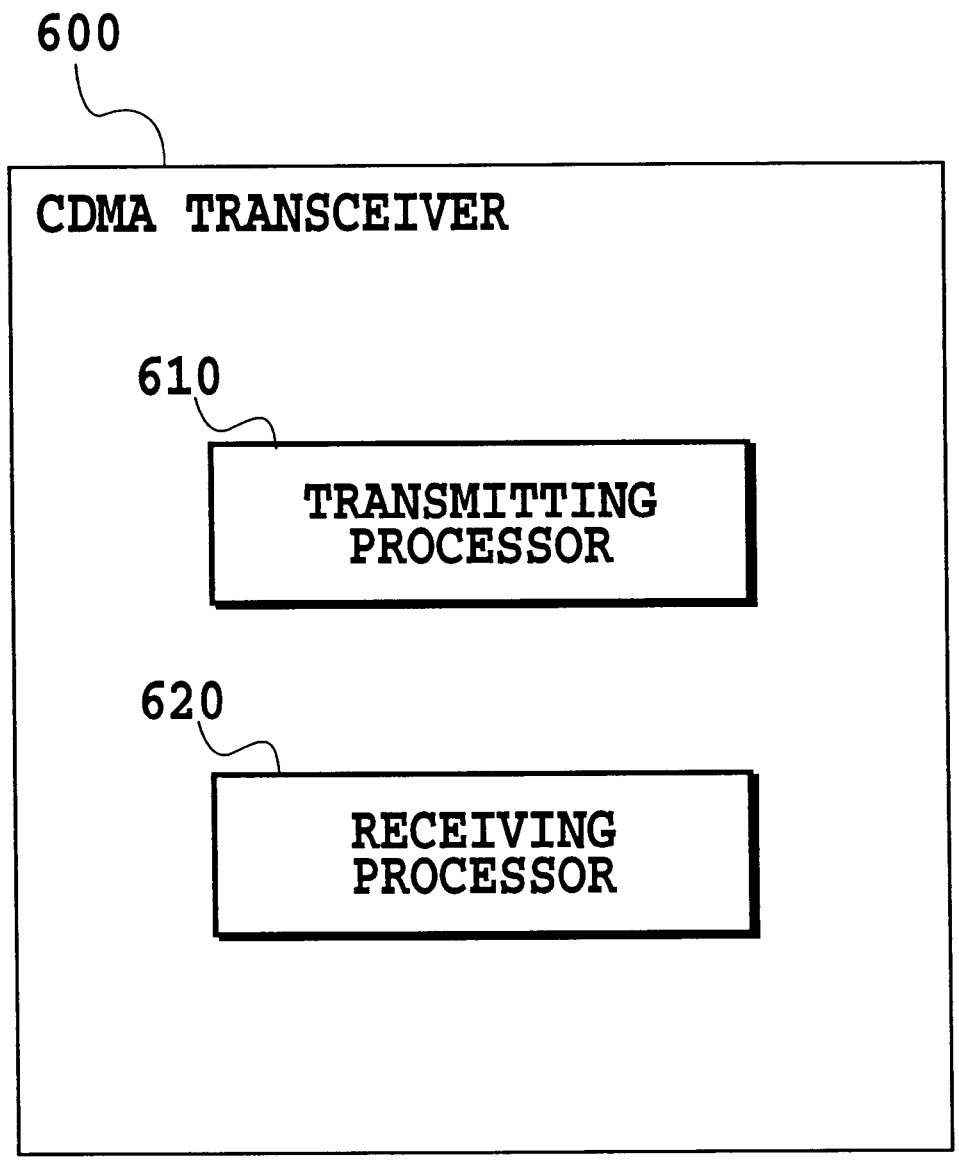
FIG. 6 is a block diagram showing a configuration of a CDMA transceiver as a third embodiment in accordance with the present invention.

FIG. 6 is a block diagram showing a configuration of a CDMA transceiver as a third embodiment in accordance with the present invention. A CDMA transceiver 600 of the present embodiment comprises a transmitting processor 610 and a receiving processor 620. The transmitting processor 610 generates a spread data symbol sequence by modulating a data sequence, and transmits the spread data symbol sequence along with a pilot symbol sequence which is parallel with the data symbol sequence and undergoes spreading. The receiving processor 620 receives the spread data symbol sequence and the spread pilot symbol sequence, and demodulates the spread data symbol sequence using the spread pilot symbol sequence to generate the data sequence. In the present embodiment, this station (the present CDMA transceiver) exchanges power control symbols with a party station. The power control symbols are symbols (command) for controlling power of the data symbol sequence and the pilot symbol sequence.

Figure 7:
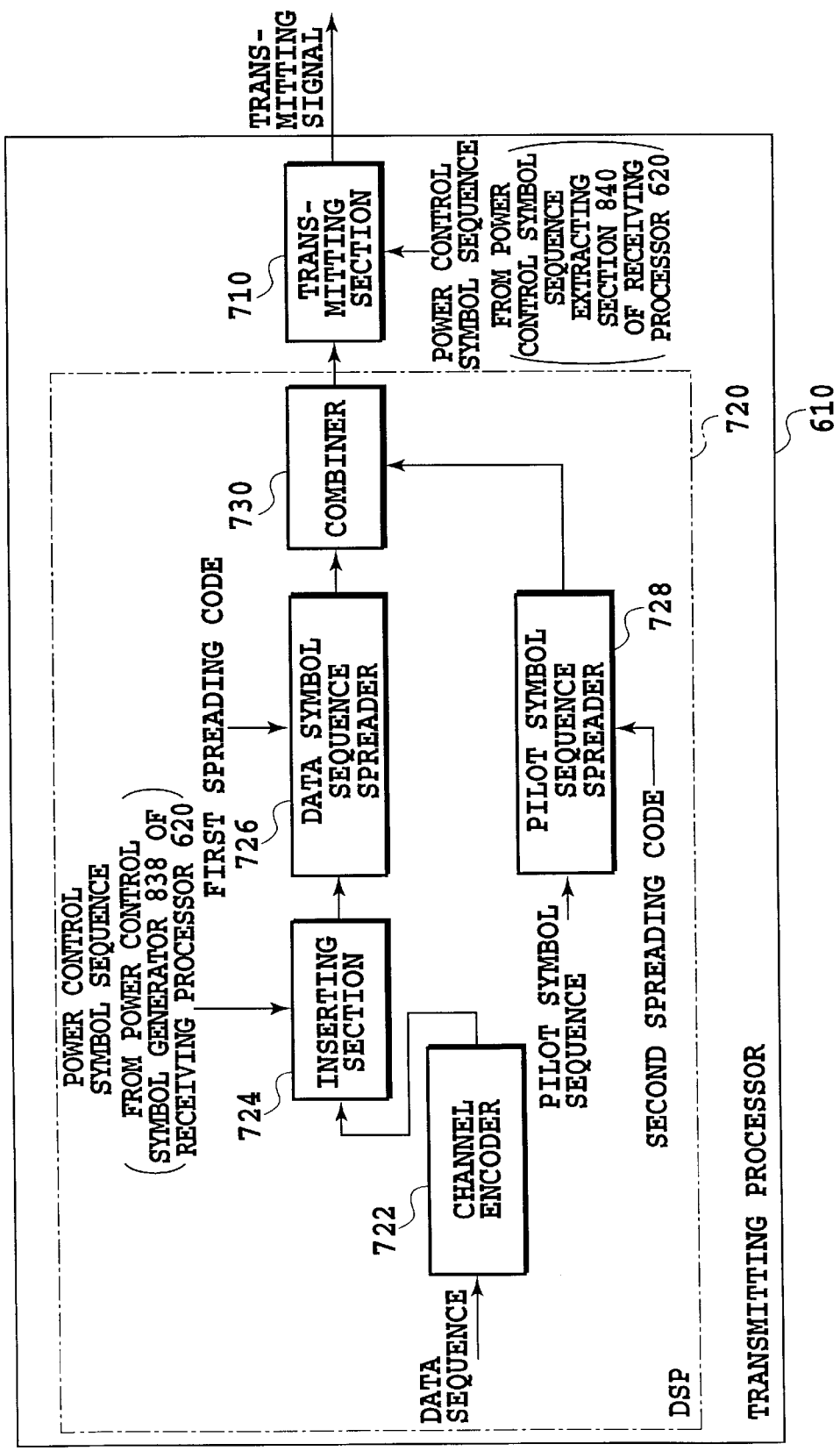
FIG. 7 is a block diagram showing a configuration of a transmitting processor of the CDMA transceiver of the third embodiment in accordance with the present invention.
Figure 8:
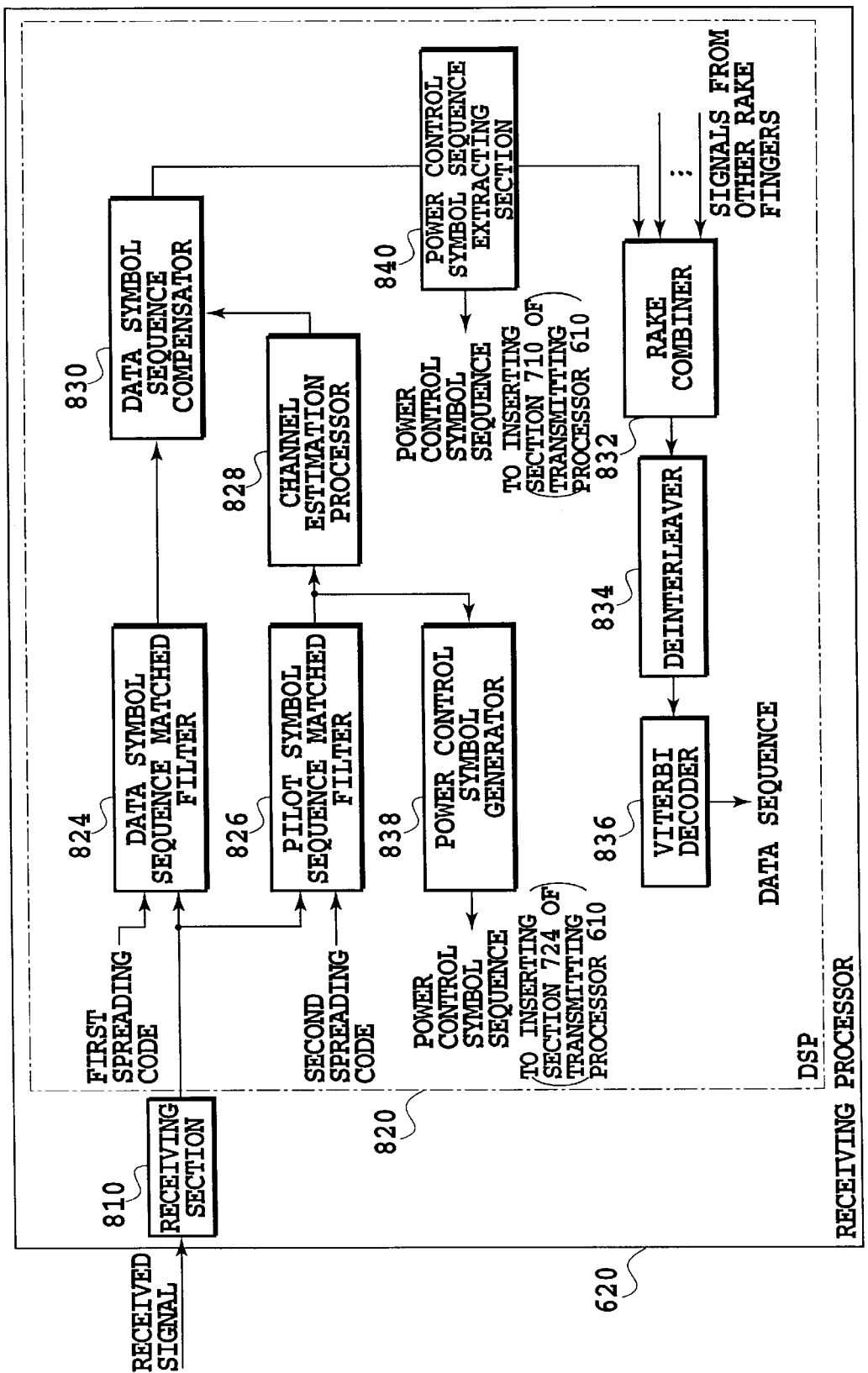
FIG. 8 is a block diagram showing a configuration of a receiving processor of the CDMA transceiver of the third embodiment in accordance with the present invention.

FIG. 7 shows a configuration of the transmitting processor 610, and FIG. 8 shows a configuration of the receiving processor.

As shown in FIG. 7, the transmitting processor 610 comprises a transmitting section 710, a channel encoder 722, an inserting section 724, a data symbol sequence spreader 726, a pilot symbol sequence spreader 728 and a combiner 730. Although these components such as the channel encoder 722, inserting section 724 and so forth are implemented in the form of software using a DSP (and a memory that stores programs) 720 in the present embodiment, they can be implemented with hardware.

Figure 9:
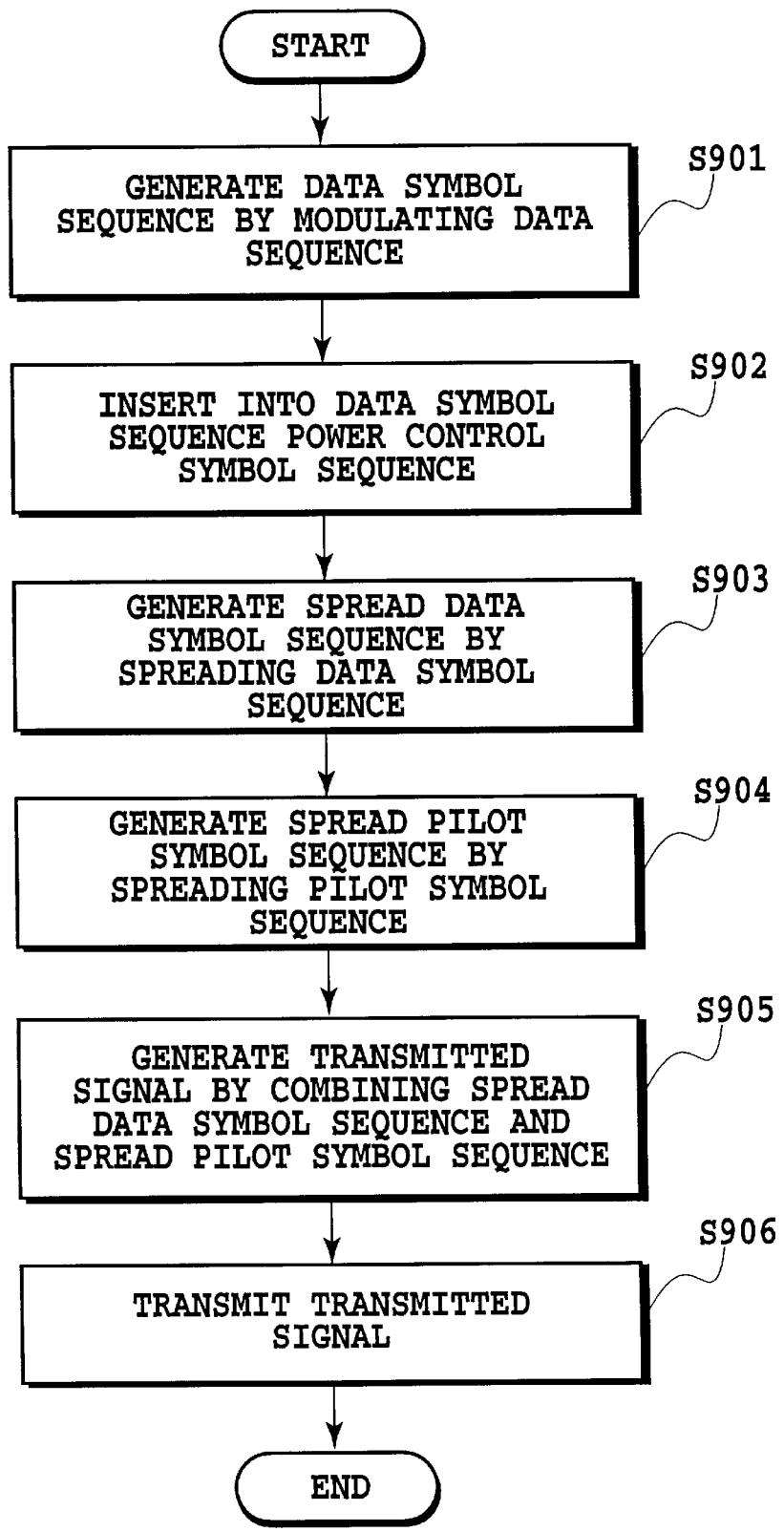
FIG. 9 is a flowchart illustrating a transmitting processing by the transmitting processor of the CDMA transceiver of the third embodiment in accordance with the present invention.

FIG. 9 is a flowchart illustrating a transmitting processing by the transmitting processor of the CDMA transceiver of the present embodiment. First, at step S901, the channel encoder 722 generates the data symbol sequence by modulating (encoding) the data sequence.

At step S902, the inserting section 724 inserts into the data symbol sequence the power control symbol sequence the party station uses to determine the power of a data symbol sequence and a pilot symbol sequence to be transmitted from the party station to the present station.

Figure 10:
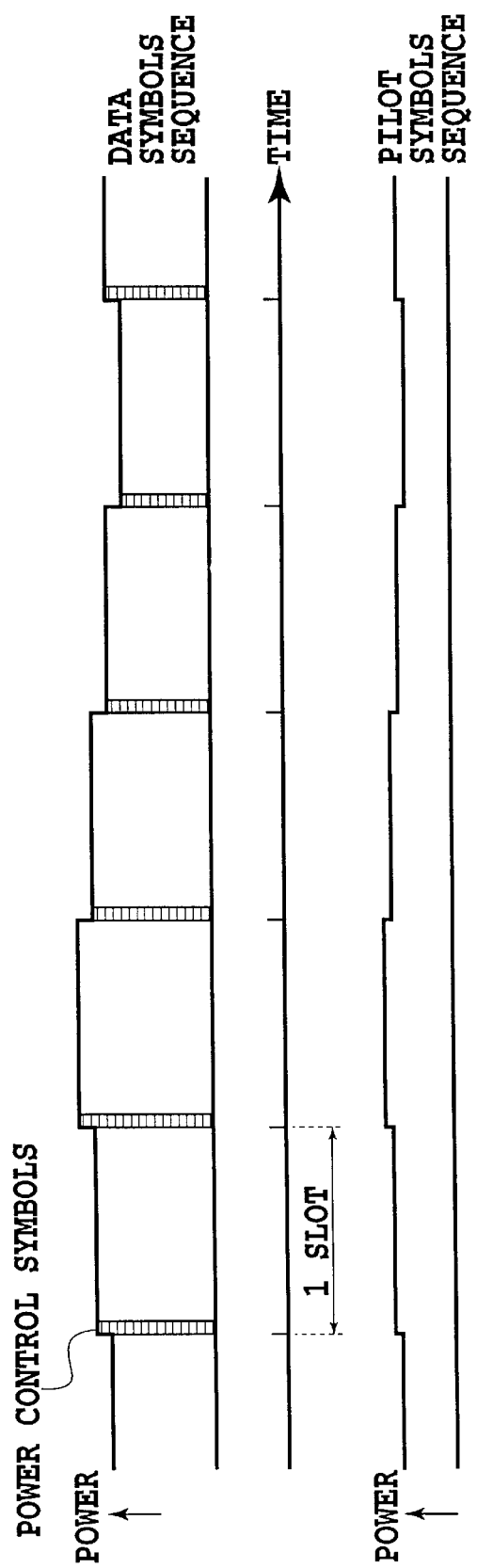
FIG. 10 is a diagram illustrating a transmission example which inserts power control symbols into a data symbol sequence.

FIG. 10 is a diagram illustrating an example that inserts the power control symbols into the data symbol sequence to be transmitted, in which case, the power control symbols are inserted into the data symbol sequence at every one-slot interval.

Although the power control symbols are inserted into the data symbol sequence to be transmitted in the present embodiment, they can be inserted into the pilot symbol sequence to be transmitted, or they can be transmitted as another sequence in addition to the data symbol sequence and pilot symbol sequence, as will be described later.

Returning to FIG. 9, at step S903, the data symbol sequence spreader 726 spreads the data symbol sequence using the first spreading code to generate the spread data symbol sequence. At step S904, the pilot symbol sequence spreader 728 spreads the pilot symbol sequence using the second spreading code to generate the spread pilot symbol sequence. The first spreading code and the second spreading code are orthogonal to each other.

At step S905, the combiner 730 combines the spread data symbol sequence and the spread pilot symbol sequence to generate a transmitted signal.

At step S906, the transmitting section 710 transmits the transmitted signal in accordance with a power control symbol sequence which is sent from the party station to the present station.

Next, as shown in FIG. 8, the receiving processor 620 comprises a receiving section 810, a data symbol sequence matched filter 824, a pilot symbol sequence matched filter 826, a channel estimation processor 828, a data symbol sequence compensator 830, a RAKE combiner 832, a deinterleaver 834, a Viterbi decoder 836, a power control symbol generator 838 and a power control symbol sequence extracting section 840. Although these components such as the data symbol sequence matched filter 824, pilot symbol sequence matched filter 826 and so forth are implemented in the form of software using a DSP (and a memory that stores programs) 820 in the present embodiment, they can be implemented with hardware. The structure and functions of the channel estimation processor 828 are the same as those of the channel estimation unit 100 of the first embodiment in accordance with the present invention, and the structure and functions of the receiving section 810, data symbol sequence matched filter 824 and so forth are the same as those of their counterparts of the CDMA receiver of the second embodiment. Accordingly, the receiving processor 620 carries out the same processings as those (FIG. 5) of the CDMA receiver of the second embodiment in accordance with the present invention.

The power control symbol generator 838 measures the SNIR from the pilot symbol sequence supplied from the pilot symbol sequence matched filter 826, and generates the power control symbols in response to the measured values. As a measuring method of the SNIR, there is a method of measuring it by obtaining the average and variance of the received signal. The SNIR measurement can also use feedback data symbol sequence after decision. The power control symbols generated here are supplied to the inserting section 724 of the transmitting processor 610, which inserts them into the data symbol sequence when transmitting the next signal to the party station to be transmitted. Receiving the symbols, the party station uses them when transmitting a signal to the present station.

The power control symbol sequence extracting section 840 extracts from the data symbol sequence the power control symbol sequence, and supplies it to the transmitting section 710 of the transmitting processor 610 to be used when transmitting the next signal to the party station.

Figure 11:
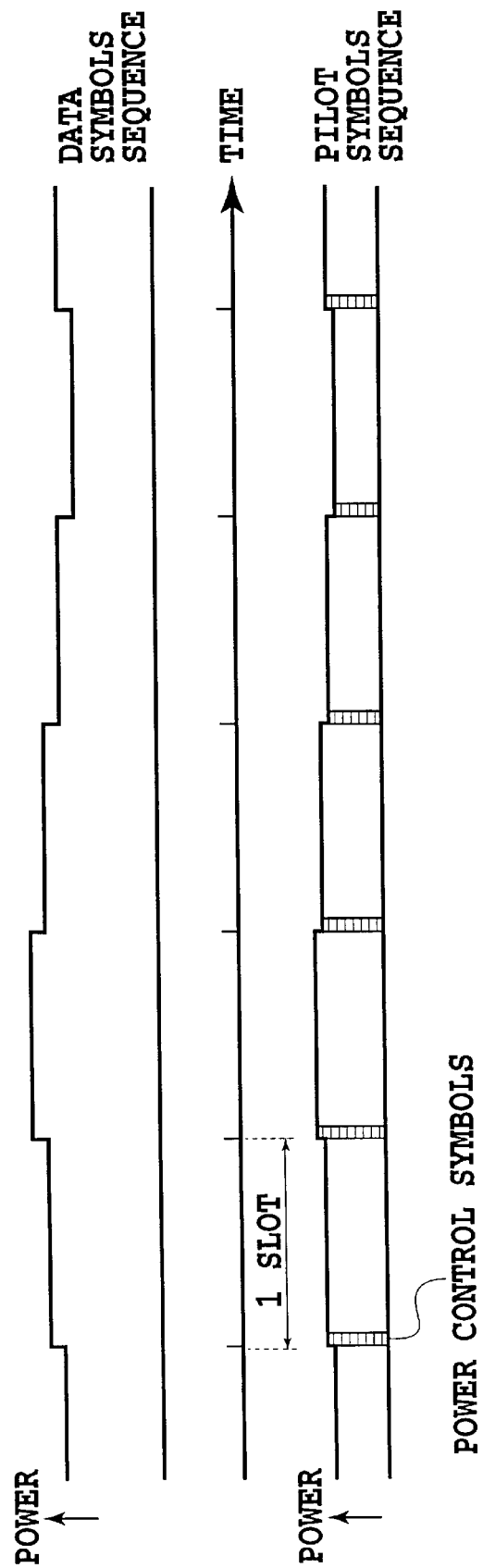
FIG. 11 is a diagram illustrating a transmission example which inserts power control symbols into a pilot symbol sequence.

The power control symbols can also be inserted into the pilot symbol sequence. FIG. 11 is a diagram illustrating a transmission example in which power control symbols are inserted into a pilot symbol sequence to be transmitted. To insert the power control symbols into the pilot symbol sequence, a component corresponding to the inserting section 724 is installed in the transmitting processor 610 so that it inserts into the pilot symbol sequence the power control symbol sequence, and a component corresponding to the power control symbol sequence extracting section 840 is installed in the receiving processor 620 so that it extracts from the pilot symbol sequence the power control symbol sequence.

Figure 12:
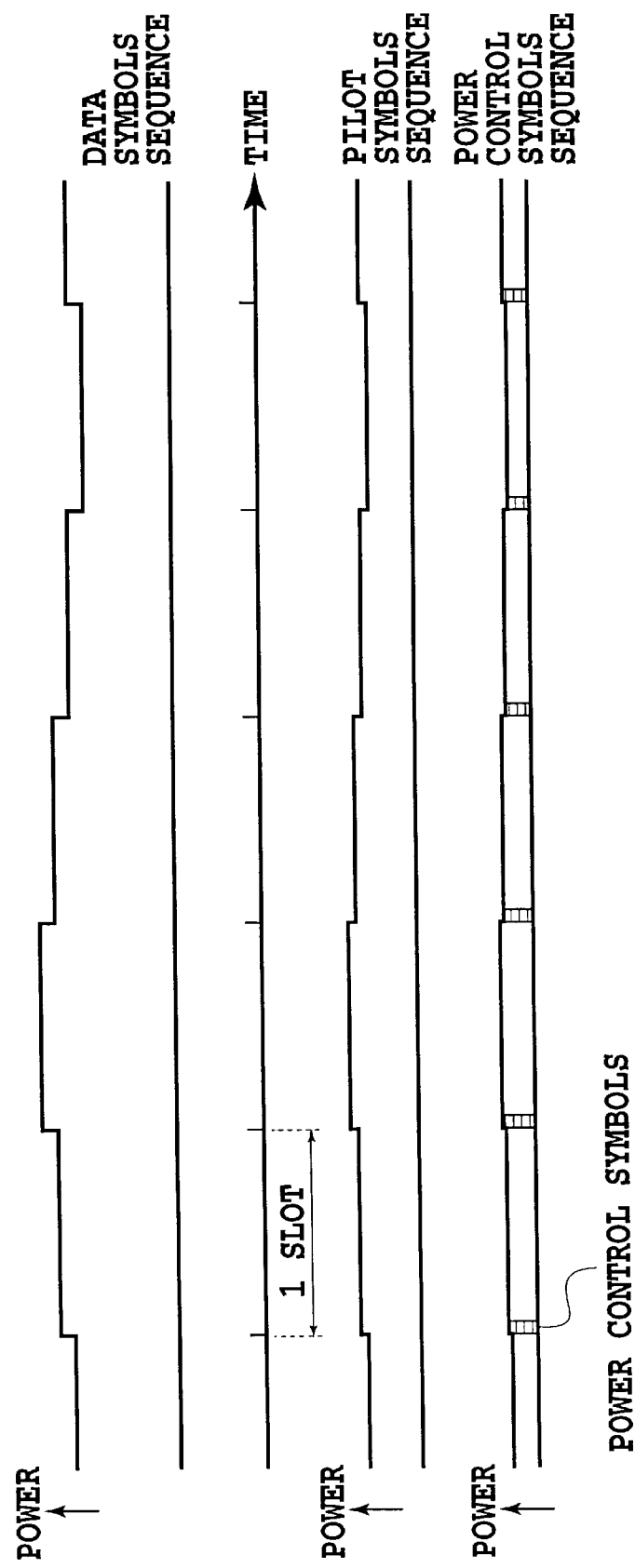
FIG. 12 is a diagram illustrating a transmission example which transmits power control symbols in a sequence apart from the data symbol sequence and pilot symbol sequence.
Figure 13:
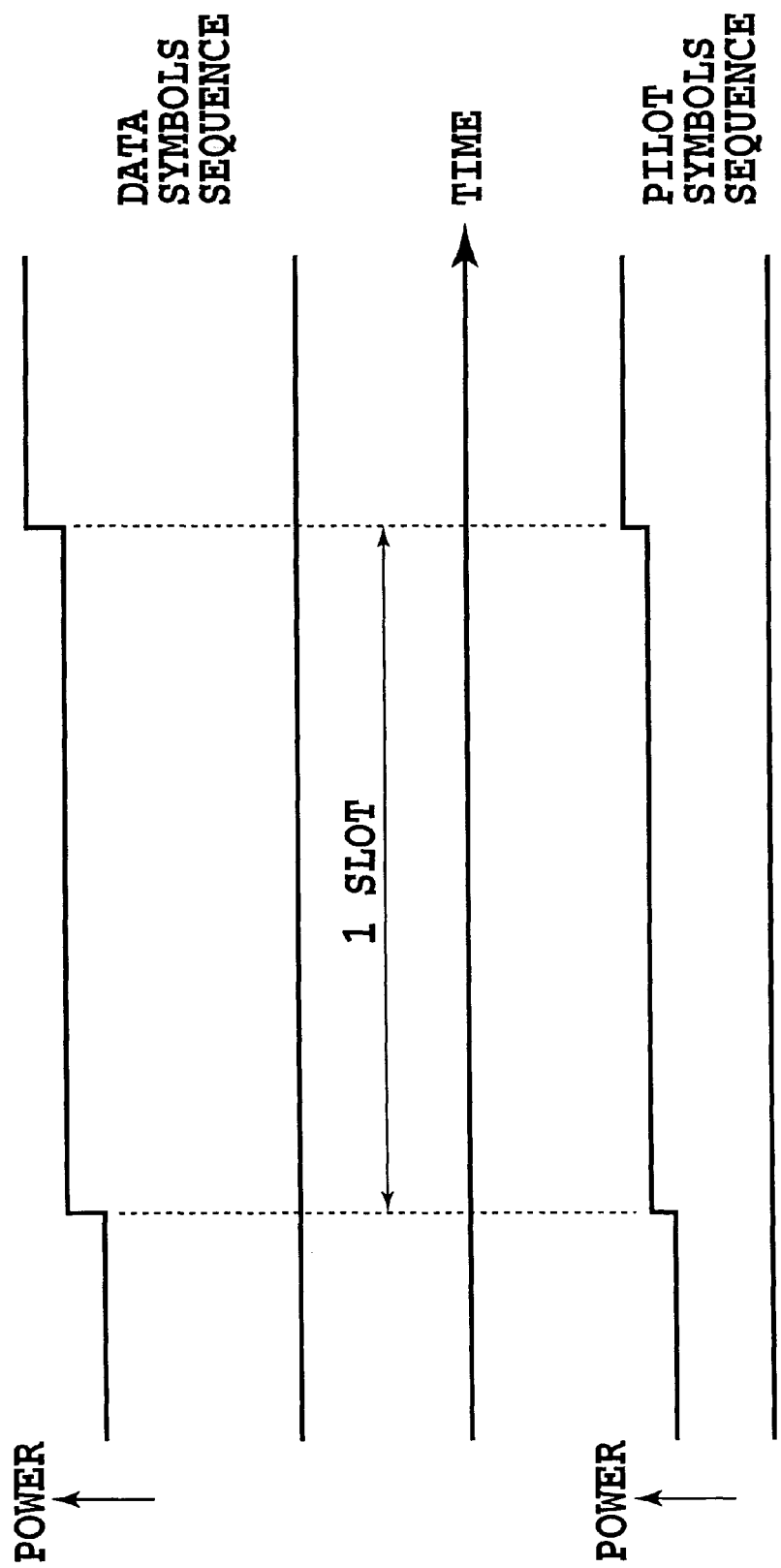
FIG. 13 is a diagram illustrating the principle of the channel estimation operation by a related art.

The power control symbols can be transmitted as another sequence in addition to the data symbol sequence and the pilot symbol sequence. FIG. 12 is a diagram illustrating a transmission example in which the power control symbols are transmitted in a sequence apart from the data symbol sequence and pilot symbol sequence. To transmit the power control symbols in a sequence besides the data symbol sequence and pilot symbol sequence, a means for spreading the power control symbols is provided in the transmitting processor 610. The spread power control symbol sequence is combined with the spread data symbol sequence and the spread pilot symbol sequence to be transmitted. To spread the power control symbol sequence, a third spreading code is used which is orthogonal to the first spreading code used for spreading the data symbol sequence and to the second spreading code used for spreading the pilot symbol sequence. The receiving processor 620 is provided with a means for despreading the power control symbol sequence, and receives the spread power control symbol sequence and despreads it.

The transmission of the power control symbol sequence can be unidirectional rather than bidirectional. For example, the power control symbol sequence can be transmitted only from a base station to a mobile station to control the (transmission) power of only a reverse channel (from the mobile station to the base station) in communications between the two stations.

Thus, the transceiver can achieve in its processing highly accurate channel estimation and compensation for the channel fluctuations in the data symbol sequence.

As described above, the present invention can achieve, when performing the channel estimation of the data symbols, the highly accurate channel estimation by obtaining highly accurate channel estimates by calculating the sum of the pilot symbols which are appropriately weighted.

In addition, using the pilot symbols in the slots other than the slot including the data symbols to be estimated, the channel estimation of the data symbols can further improve its accuracy.

The highly accurate channel estimation together with the compensation for the channel fluctuations in the data symbols on the basis of the channel estimation makes it possible to decide the absolute phases of individual data symbols by using the absolute coherent detection, and to reduce the SNIR needed for achieving the desired receiving quality (receiving error rate). As a result, the transmission power can be reduced, and the capacity of the system in terms of the number of subscribers can be increased.

What is claimed is:

1. A CDMA receiver which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiver comprising:

means for receiving the spread data symbol sequence and the spread pilot symbol sequence;

means for generating a data symbol sequence by despreading the spread data symbol sequence;

means for generating a pilot symbol sequence by despreading the spread pilot symbol sequence;

means for generating from the pilot symbol sequence a plurality of pilot blocks;

means for obtaining channel estimates of the data symbols by calculating a weighted sum of averages of the pilot symbols in the individual pilot blocks;

means for compensating for channel fluctuations in the data symbol sequence by using the channel estimates of the data symbols; and means for generating the data sequence by demodulating the data symbol sequence compensated for, wherein the spread data symbol sequence has been spread using a first spreading code, the spread pilot symbol sequence has been spread using a second spreading code, said means for generating the data symbol sequence despreads the spread data symbol sequence which has been spread using the first spreading code, and said means for generating the pilot symbol sequence despreads the spread pilot symbol sequence which has been spread using the second spreading code, and wherein the first spreading code and the second spreading code are orthogonal to each other.

2. A CDMA transceiver having a transmitting processor and a receiving processor, said transmitting processor generating a spread data symbol sequence by modulating a data sequence, and transmitting the spread data symbol sequence with a spread pilot symbol sequence which is spread in parallel with the data symbol sequence, and said receiving processor receiving the spread data symbol sequence and the spread pilot symbol sequence, and generating the data sequence by demodulating the spread data symbol sequence by using the spread pilot symbol sequence, wherein said transmitting processor comprises:

means for generating the data symbol sequence by modulating the data sequence;

means for generating the spread data symbol sequence by spreading the data symbol sequence;

means for generating the spread pilot symbol sequence by spreading the pilot symbol sequence; and means for transmitting the spread data symbol sequence and the spread pilot symbol sequence, and wherein said receiving processor comprises:

means for receiving the spread data symbol sequence and the spread pilot symbol sequence;

means for generating the data symbol sequence by despreading the spread data symbol sequence;

means for generating the pilot symbol sequence by despreading the spread pilot symbol sequence;

means for generating from the pilot symbol sequence a plurality of pilot blocks;

means for obtaining channel estimates of the data symbols by calculating a weighted sum of averages of the pilot symbols in the individual pilot blocks;

means for compensating for channel fluctuations in the data symbol sequence by using the channel estimates of the data symbols; and means for generating the data sequence by demodulating the data symbol sequence compensated for.

3. The CDMA transceiver as claimed in claim 2, wherein said means for generating the spread data symbol sequence spreads the data symbol sequence using a first spreading code, said means for generating the spread pilot symbol sequence spreads the pilot symbol sequence using a second spreading code, said means for generating the data symbol sequence despreads the spread data symbol sequence which has been spread using the first spreading code, and said means for generating the pilot symbol sequence despreads the spread pilot symbol sequence which has been spread using the second spreading code, and wherein the first spreading code and the second spreading code are orthogonal to each other.

4. The CDMA transceiver as claimed in claim 2, wherein said means for transmitting the spread data symbol sequence and the spread pilot symbol sequence also transmits a spread power control symbol sequence for controlling power of the data symbol sequence and that of the pilot symbol sequence.

5. The CDMA transceiver as claimed in claim 4, wherein said transmitting processor further comprises means for inserting into the data symbol sequence the power control symbol sequence.

6. The CDMA transceiver as claimed in claim 4, wherein said transmitting processor further comprises means for inserting into the pilot symbol sequence the power control symbol sequence.

7. The CDMA transceiver as claimed in claim 4, wherein said transmitting processor further comprises means for generating the spread power control symbol sequence by spreading the power control symbol sequence, and said means for transmitting the spread data symbol sequence and the spread pilot symbol sequence also transmits the power control symbol sequence.

8. The CDMA transceiver as claimed in claim 7, wherein said means for generating a spread data symbol sequence spreads the data symbol sequence by using a first spreading code, said means for generating a spread pilot symbol sequence spreads the pilot symbol sequence by using a second spreading code, and said means for generating a spread power control symbol sequence spreads the power control symbol sequence by using a third spreading code, wherein said means for generating a data symbol sequence despreads the spread data symbol sequence by using the first spreading code, said means for generating a pilot symbol sequence despreads the spread pilot symbol sequence by using the second spreading code, and said means for generating a power control symbol sequence despreads the spread power control symbol sequence by using the third spreading code, and wherein the first spreading code, the second spreading code and the third spreading code are orthogonal to each other.

9. The CDMA transceiver as claimed in claim 4, wherein said receiving processor further comprises means for measuring from the pilot symbol sequence a signal-to-noise and interference power ratio, and for generating the power control symbol sequence from the signal-to-noise and interference power ratio.

10. The CDMA transceiver as claimed in claim 2, wherein said receiving processor further comprises means for generating the power control symbol sequence by despreading the spread power control symbol sequence for controlling the power of the data symbol sequence and that of the pilot symbol sequence; and means for extracting the power control symbol sequence, and wherein said means for receiving the spread data symbol sequence and the spread pilot symbol sequence receives the spread power control symbol sequence, and said means for transmitting the spread data symbol sequence and the spread pilot symbol sequence transmits the spread data symbol sequence and the spread pilot symbol sequence in accordance with the power control symbol sequence.

11. A channel estimation unit for obtaining channel estimates of data symbols from a pilot symbol sequence which is parallel to a data symbol sequence, said channel estimation unit comprising:

means for generating a plurality of pilot blocks from the pilot symbol sequence; and means for obtaining the channel estimates of the data symbols by calculating a weighted sum of averages of the pilot symbols in the individual pilot blocks, wherein the power of the data symbol sequence and that of the pilot symbol sequence are controlled on a slot by slot basis, and wherein the plurality of pilot blocks each consist of pilot symbols belonging to at least two different slots.

12. A channel estimation unit for obtaining channel estimates of data symbols from a pilot symbol sequence which is parallel to a data symbol sequence, said channel estimation unit comprising:

means for generating a plurality of pilot blocks from the pilot symbol sequence; and means for obtaining the channel estimates of the data symbols by calculating a weighted sum of averages of the pilot symbols in the individual pilot blocks, wherein when obtaining the channel estimate of an nth data symbol in the data symbol sequence, where n is an integer, the plurality of the pilot blocks each consist of pilot symbols from (n-K+1)th pilot symbol to (n+K)th pilot symbol in the pilot symbol sequence, where K is a natural number.

13. A channel estimation unit for obtaining channel estimates of data symbols from a pilot symbol sequence which is parallel to a data symbol sequence, said channel estimation unit comprising:

means for generating a plurality of pilot blocks from the pilot symbol sequence; and means for obtaining the channel estimates of the data symbols by calculating a weighted sum of averages of the pilot symbols in the individual pilot blocks, wherein when obtaining the channel estimate of an nth data symbol in the data symbol sequence, where n is an integer, the pilot blocks consisting of pilot symbols closer to the nth pilot symbol have a greater weight.

14. A CDMA transmitting and receiving method which generates a spread data symbol sequence by modulating a data sequence, transmits the spread data symbol sequence with a pilot symbol sequence which is spread in parallel with the data symbol sequence, receives the spread data symbol sequence and the spread pilot symbol sequence, and generates the data sequence by demodulating the spread data symbol sequence by using the spread pilot symbol sequence, wherein a transmitting side comprises the steps of:
generating the data symbol sequence by modulating the data sequence;
generating the spread data symbol sequence by spreading the data symbol sequence;
generating the spread pilot symbol sequence by spreading the pilot symbol sequence; and
transmitting the spread data symbol sequence and the spread pilot symbol sequence, and wherein a receiving side comprises the steps of:
receiving the spread data symbol sequence and the spread pilot symbol sequence;
generating the data symbol sequence by despreading the spread data symbol sequence;
generating the pilot symbol sequence by despreading the spread pilot symbol sequence;
generating from the pilot symbol sequence a plurality of pilot blocks;
obtaining channel estimates of the data symbols by calculating a weighted sum of averages of the pilot symbols contained in the pilot blocks;
compensating for channel fluctuations in the data symbol sequence by using the channel estimates of the data symbols; and
generating the data sequence by demodulating the data symbol sequence compensated for.

15. A CDMA receiver which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiver comprising:

means for receiving the spread data symbol sequence and the spread pilot symbol sequence;

means for generating a data symbol sequence by despreading the spread data symbol sequence;

means for generating a pilot symbol sequence by despreading the spread pilot symbol sequence;

means for generating from the pilot symbol sequence a plurality of pilot blocks;

means for obtaining channel estimates of the data symbols by calculating a weighted sum of averages of the pilot symbols in the individual pilot blocks;

means for compensating for channel fluctuations in the data symbol sequence by using the channel estimates of the data symbols; and means for generating the data sequence by demodulating the data symbol sequence compensated for, wherein the power of the data symbol sequence and that of the pilot symbol sequence are controlled on a slot by slot basis, and wherein the plurality of pilot blocks each consist of pilot symbols belonging to at least two different slots.

16. A CDMA receiver which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiver comprising:

means for receiving the spread data symbol sequence and the spread pilot symbol sequence;

means for generating a data symbol sequence by despreading the spread data symbol sequence;

means for generating a pilot symbol sequence by despreading the spread pilot symbol sequence;

means for generating from the pilot symbol sequence a plurality of pilot blocks;

means for obtaining channel estimates of the data symbols by calculating a weighted sum of averages of the pilot symbols in the individual pilot blocks;

means for compensating for channel fluctuations in the data symbol sequence by using the channel estimates of the data symbols; and means for generating the data sequence by demodulating the data symbol sequence compensated for, wherein when obtaining the channel estimate of an nth data symbol in the data symbol sequence, where n is an integer, the plurality of the pilot blocks each consist of pilot symbols from (n−K+1)th pilot symbol to (n+K)th pilot symbol in the pilot symbol sequence, where K is a natural number.

17. A CDMA receiver which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiver comprising:

means for receiving the spread data symbol sequence and the spread pilot symbol sequence;

means for generating a data symbol sequence by despreading the spread data symbol sequence;

means for generating a pilot symbol sequence by despreading the spread pilot symbol sequence;

means for generating from the pilot symbol sequence a plurality of pilot blocks;

means for obtaining channel estimates of the data symbols by calculating a weighted sum of averages of the pilot symbols in the individual pilot blocks;

means for compensating for channel fluctuations in the data symbol sequence by using the channel estimates of the data symbols; and means for generating the data sequence by demodulating the data symbol sequence compensated for, wherein when obtaining the channel estimate of an nth data symbol in the date symbol sequence, where n is an integer, the pilot blocks consisting of pilot symbols closer to the nth pilot symbol have a greater weight.

18. A channel estimation method for obtaining channel estimates of data symbols from a pilot symbol sequence which is parallel with a data symbol sequence, said channel estimation method comprising the steps of:

generating a plurality of pilot blocks from the pilot symbol sequence; and obtaining the channel estimates of the data symbols by calculating a weighted sum of averages of the pilot symbols in the individual pilot blocks, wherein the power of the data symbol sequence and that of the pilot symbol sequence are controlled on a slot by slot basis, and wherein the plurality of pilot blocks each consist of pilot symbols belonging to at least two different slots.

19. A channel estimation method for obtaining channel estimates of data symbols from a pilot symbol sequence which is parallel with a data symbol sequence, said channel estimation method comprising the steps of:

generating a plurality of pilot blocks from the pilot symbol sequence; and obtaining the channel estimates of the data symbols by calculating a weighted sum of averages of the pilot symbols in the individual pilot blocks, wherein when obtaining the channel estimate of an nth data symbol in the data symbol sequence, where n is an integer, the plurality of the pilot blocks each consist of pilot symbols from (n−K+1)th pilot symbol to (n+K)th pilot symbol in the pilot symbol sequence, where K is a natural number.

20. A channel estimation method for obtaining channel estimates of data symbols from a pilot symbol sequence which is parallel with a data symbol sequence, said channel estimation method comprising the steps of:

generating a plurality of pilot blocks from the pilot symbol sequence; and obtaining the channel estimates of the data symbols by calculating a weighted sum of averages of the pilot symbols in the individual pilot blocks, wherein when obtaining the channel estimate of an nth data symbol in the data symbol sequence, where n is an integer, the pilot blocks consisting of pilot symbols closer to the nth pilot symbol have a greater weight.

21. A CDMA receiving method which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiving method comprising the steps of:

receiving the spread data symbol sequence and the spread pilot symbol sequence;

generating a data symbol sequence by despreading the spread data symbol sequence;

generating a pilot symbol sequence by despreading the spread pilot symbol sequence;

generating from the pilot symbol sequence a plurality of pilot blocks;

obtaining channel estimates of the data symbols by calculating a weighted sum of averages of the pilot symbols in the individual pilot blocks;

compensating for channel fluctuations in the data symbol sequence by using the channel estimates of the data symbols; and generating the data sequence by demodulating the data symbol sequence compensated for, wherein the spread data symbol sequence has been spread using a first spreading code, the spread pilot symbol sequence has been spread using a second spreading code, said step of generating the data symbol sequence despreads the spread data symbol sequence which has been spread using the first spreading code, and said step of generating the pilot symbol sequence despreads the spread pilot symbol sequence which has been spread using the second spreading code, and wherein the first spreading code and the second spreading code are orthogonal to each other.

22. A CDMA receiving method which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiving method comprising the steps of:

receiving the spread data symbol sequence and the spread pilot symbol sequence;

generating a data symbol sequence by despreading the spread data symbol sequence;

generating a pilot symbol sequence by despreading the spread pilot symbol sequence;

generating from the pilot symbol sequence a plurality of pilot blocks;

obtaining channel estimates of the data symbols by calculating a weighted sum of averages of the pilot symbols in the individual pilot blocks;

compensating for channel fluctuations in the data symbol sequence by using the channel estimates of the data symbols; and generating the data sequence by demodulating the data symbol sequence compensated for, wherein the power of the data symbol sequence and that of the pilot symbol sequence are controlled on a slot by slot basis, and wherein the plurality of pilot blocks each consist of pilot symbols belonging to at least two different slots.

23. A CDMA receiving method which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiving method comprising the steps of:

receiving the spread data symbol sequence and the spread pilot symbol sequence;

generating a data symbol sequence by despreading the spread data symbol sequence;

generating a pilot symbol sequence by despreading the spread pilot symbol sequence;

generating from the pilot symbol sequence a plurality of pilot blocks;

obtaining channel estimates of the data symbols by calculating a weighted sum of averages of the pilot symbols in the individual pilot blocks;

compensating for channel fluctuations in the data symbol sequence by using the channel estimates of the data symbols; and generating the data sequence by demodulating the data symbol sequence compensated for, wherein when obtaining the channel estimate of an nth data symbol in the data symbol sequence, where n is an integer, the plurality of the pilot blocks each consist of pilot symbols from $(n-K+1)$th pilot symbol to $(n+K)$th pilot symbol in the pilot symbol sequence, where K is a natural number.

24. A CDMA receiving method which receives a data symbol sequence that is spread, and a pilot symbol sequence that is spread and parallel to the data symbol sequence, and which generates a data sequence by demodulating the spread data symbol sequence by using the spread pilot symbol sequence, said CDMA receiving method comprising the steps of:

receiving the spread data symbol sequence and the spread pilot symbol sequence;

generating a data symbol sequence by despreading the spread data symbol sequence;

generating a pilot symbol sequence by despreading the spread pilot symbol sequence;

generating from the pilot symbol sequence a plurality of pilot blocks;

obtaining channel estimates of the data symbols by calculating a weighted sum of averages of the pilot symbols in the individual pilot blocks;

compensating for channel fluctuations in the data symbol sequence by using the channel estimates of the data symbols; and generating the data sequence by demodulating the data symbol sequence compensated for, wherein when obtaining the channel estimate of an nth data symbol in the data symbol sequence, where n is an integer, the pilot blocks consisting of pilot symbols closer to the nth pilot symbol have a greater weight.

* * * * *